United States Patent [19]

Chang et al.

[11] Patent Number: 5,469,519
[45] Date of Patent: Nov. 21, 1995

[54] OPTICAL WAVEGUIDE IMAGE TRANSMISSION SYSTEM AND METHOD

[75] Inventors: David B. Chang, Tustin; Victor Vali, Laguna Hills; I-Fu Shih, Los Alamitos, all of Calif.

[73] Assignee: Hughes Aircraft Company, Los Angeles, Calif.

[21] Appl. No.: 13,288

[22] Filed: Feb. 4, 1993

[51] Int. Cl.$^6$ .................................................. G02B 6/32
[52] U.S. Cl. ............................................ 385/33; 385/129
[58] Field of Search .................................. 385/129–132, 385/33, 31, 116–126

[56] References Cited

U.S. PATENT DOCUMENTS

| | | | |
|---|---|---|---|
| 4,087,159 | 5/1978 | Ulrich | 385/129 |
| 4,482,805 | 11/1984 | Palmer | 385/1 |
| 4,518,219 | 5/1985 | Leonberger et al. | 385/132 |
| 4,779,984 | 10/1988 | Cook | 385/33 |
| 4,856,861 | 8/1989 | Miyanaki et al. | 385/129 |
| 5,208,685 | 5/1993 | Aleksoff et al. | 385/129 |

*Primary Examiner*—Rodney B. Bovernick
*Assistant Examiner*—John Ngo
*Attorney, Agent, or Firm*—Elizabeth E. Leitereg; Terje Gudmestad; W. K. Denson-Low

[57] ABSTRACT

An improved image transmission system which includes an elongate optical waveguide 15 having an input aperture 17 and an output aperture 19. Optical apparatus 11, 13 is provided for injecting a transform of an image into the waveguide. In a specific implementation, the Fourier transform of the image is injected at the input aperture 17. The output image is transformed as well to provide the desired image. When the Fourier components of the image are transmitted, each component propagates at a different velocity. However, the magnitude of the components are preserved and used to reconstruct the image at the output of the waveguide. This allows for the transmission of optical images without digitization with a single, inexpensive waveguide.

5 Claims, 1 Drawing Sheet

OPTICAL WAVEGUIDE IMAGE TRANSMISSION SYSTEM AND METHOD

BACKGROUND OF THE INVENTION

1. Field of the Invention

The present invention relates to image transmission systems. More specifically, the present invention relates to image transmission over optical waveguides.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Image transmissions systems either transmit an optical image or an electrical representation of the optical image. Electrical image transmission systems are often limited by bandwidth constraints. Accordingly, optical image transmission is often preferred over electrical image transmission where large amounts of image data are required.

Optical image transmission systems use either multiple optical fibers or a single optical fiber. In multiple fiber systems, the image is input to an array of fibers. Each fiber conveys the average image intensity of an associated pixel. With one fiber being provided for each pixel of output image data required, an image of 1,000 by 1,000 pixels requires a fiber optic bundle of 1 million fibers. Additional fibers may be required for redundancy in the event of breakage and/or defective fibers. As these multiple fiber bundles are expensive and bulky, single fiber image transmission systems have been investigated with limited success.

Single fiber systems include digital and analog image transmission systems. In digital systems, the image is digitized and transmitted as a series of optical pulses along the optical fiber. Conventional digital optical image systems suffer from the cost associated with the analog to digital and digital to analog conversion apparatus required and low transmission rate due to the bandwidth limitations imposed by the dispersion characteristics of the fiber.

Analog optical image transmission involves the transmission of the image down the optical fiber without conversion to the digital domain. Unfortunately, the different propagation velocities of different modes down a multimode fiber results in a scrambling of an image sent down the waveguide. Hence, previous attempts to transmit an image down a single fiber have required the use of carefully controlled gradient index fibers which behave like a series of periscope lenses continually focusing and defocusing the image down the fiber. Unfortunately, gradient index fibers are generally difficult and expensive to manufacture. In addition, the resolution of gradient index fibers is limited.

Thus, there is an ongoing need in the art for an inexpensive technique for transmitting an image along an optical waveguide.

SUMMARY OF THE INVENTION

The need in the art is addressed by the improved image transmission system of the present invention. The system includes an elongate optical waveguide having an input aperture and an output aperture. Optical apparatus is provided for injecting a transform of an image into the waveguide. In a specific implementation, the Fourier transform of the image is injected at the input aperture. The output image is transformed as well to provide the desired image.

When the Fourier components of the image are transmitted, each component propagates at a different velocity. However, the magnitude of the components are preserved and used to reconstruct the image at the output of the waveguide. This allows for the transmission of optical images without digitization with a single, inexpensive waveguide.

DESCRIPTION OF THE INVENTION

Illustrative embodiments and exemplary applications will now be described with reference to the accompanying drawings to disclose the advantageous teachings of the present invention.

Figure 1:
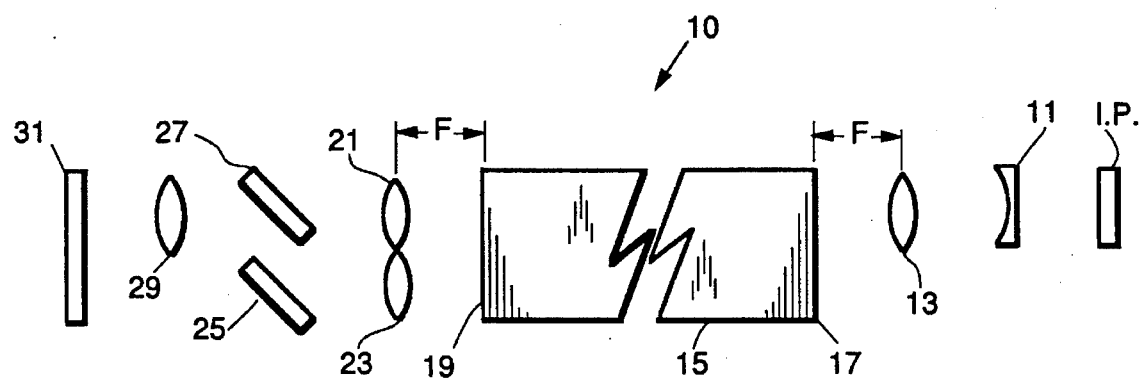
FIG. 1 is a block diagram of the improved image transmission system of the present invention.

FIG. 1 is a block diagram of the improved image transmission system of the present invention. The system 10 includes a collimating lens 11 and a focusing lens 13 disposed at the input to an optical waveguide 15. The collimating lens 11 and the focusing lens 13 may be fabricated of optical grade glass, plastic or other suitable material in a manner well known to those skilled in the art. The collimating lens serves to collimate optical energy from the image plane I.P.. The focusing lens is mounted at a distance "f" from the input aperture 17 of the optical waveguide 15 so that the input aperture 17 of the optical waveguide 15 is in the focal plane thereof. With collimated input light, the focusing lens 13 presents the Fourier transform of an image at the image plane to the input aperture 17 of the optical waveguide 15.

Figure 2A:
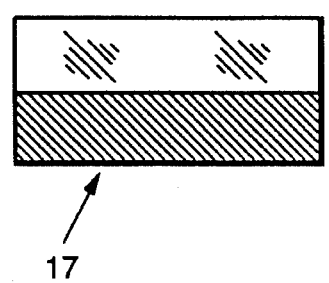
FIG. 2a is an end view of the input aperture of the optical waveguide utilized in the image transmission system of the present invention.
Figure 2B:
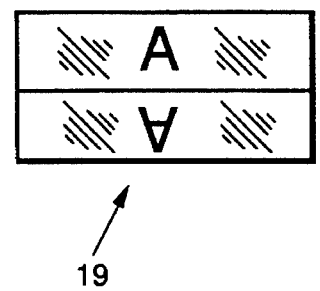
FIG. 2b is an end view of the output aperture of the optical waveguide utilized in the image transmission system of the present invention.

In the best mode, the optical waveguide is a ribbon waveguide. A ribbon waveguide is substantially flat as depicted in the end views of FIGS. 2a and 2b. FIG. 2a is an end view of the input aperture 17 and FIG. 2b is an end view of the output aperture 19 of the optical waveguide 15. The waveguide may be of any construction without departing from the scope of the present teachings. In the illustrative embodiment, the waveguide 15 is implemented by transmitting an image along the length of a microscope slide. The waveguide may also be implemented, for example, in integrated optics with a doped layer of quartz sandwiched between two undoped layers of quartz.

As shown in FIG. 2a, the lower half of the input aperture 17 is blackened and the input image is presented only to the upper half of the aperture. This will cause the output image to appear at the upper half of the output aperture and a mirror image to appear at the lower half of the output aperture 19 as depicted in FIG. 2b.

Returning to FIG. 1, second and third focusing lenses 21 and 23, respectively, are mounted at a length f, where f is the focal length of each lens, from the output aperture of the waveguide 15 to transform the transformed transmitted image to reconstruct the original image. The second and third lenses 21 and 23 may be of similar construction as the first lens 13. A first mirror 25 reflects the mirror image from the third lens 23 to a grated mirror 27. The grated mirror 27 passes the reflected image in a right-side-up orientation along with the image from the second lens 21 to an imaging plane 31 via a magnifying lens 29.

The operation of the invention may be understood with reference to the following. In a waveguide, each mode has a different longitudinal propagation velocity. For example, assuming a field component $A(x,y,z,t)$ propagating down the axis (z) of a waveguide. If the time variation of the field is $e^{i\omega t}$, then $$A(x,y,z,t) = \sum_{k_x,k_y} A_T(k_x,k_y) e^{-ik(k_x,k_y)z} e^{i\omega t} f_{k_x k_y}(x,y) \quad (1)$$

where $f_{k_x k_y}(x,y)$ denotes the transverse position dependence of the $(k_x,k_y)$ mode, $A(k_x,k_y)$ is the amplitude of that mode, and $k_\parallel(k_x,k_y)$ is determined by the dispersion relation $D(\omega,k_x,k_y,k_{11})=0$ for the waveguide. Here, $(k_x,k_y)$ is a generic representation of the mode indices, and would be chosen appropriately for the particular waveguide geometry and construction.

Image intensity is determined by $$|A(x,y,z,t)|^2 = \sum_{k_x,k_y,k_x',k_y'} A^*_T(k_x' k_y') A_T(k_x k_y) f^*_{k_x' k_y'}(x,y) f_{k_x k_y}(x,y) e^{i(k(k_x' k_y')z - k(k_x k_y)z)} \quad (2)$$

Thus, denoting the desired image as that at $z=0$:

$$|A(x,y,o,t)|^2 = \sum_{k_x,k_y,k_x',k_y'} A^*_T(k_x' k_y') A_T(k_x k_y) f^*_{k_x' k_y'}(xy) f_{k_x k_y}(x,y) \quad (3)$$

it is apparent that the image is scrambled (or distorted) because of the presence of the factor $$e^{i(k_{11}(k_x' k_y')z - k_{11}(k_x k_y)z)} \quad$$

in each term of the sum. In other words, because $k_\parallel$ and therefore the longitudinal phase velocity $\omega/k_\parallel$, depends on the mode $k_\parallel (k_x',k_y') \neq k_\parallel (k_x,k_y)$ (i.e., upon $k_x,k_y$) for general $k_x,k_y,k_x',k_y'$ and this results in a scrambling of the image. (Note that scrambling can also occur from conversion of one mode to another due to imperfections in the waveguide. However, this cause of scrambling can be made minimal by using good waveguides.)

Even though $|A(x,y,z,t)|^2 \neq |A(x,y,0,t)|^2$, it is apparent none-theless that $$|A_T(k_x,k_y)e^{ik_{11}(k_x k_y)z}|^2 = |A_T(k_x,k_g)|^2 \quad (4)$$

This is a key aspect of the present invention. That is, assume that the desired image is described by the field $e^{i\omega t}B(x,y)$, then from $$A(x,y,z=o,t) = \frac{1}{2\pi} \int e^{ik_x x + ik_y y} B(k_x,k_y) dk_x dk_y e^{i\omega t} \quad (5)$$

as above, $|A(x,y,z,t)|^2 \neq |A(x,y,0,t)|^2$ because of the different modal propagation velocities. However, this may not be to undesirable as $|B(K_x,K_y)|^2$ is the desired image and not $|A(x,y,z,t)|^2$. Thus, if it can be shown $|B(K_x,K_y)|^2$ can be constructed from $A_T(k_x,k_y)e^{-ik_\parallel(k_x k_y)z}$ just as well as from $A_T(k_x,k_y)$. This is the case for multimode waveguides with cross-sections which are several wavelengths across and for which the bulk of the intensity is contained within the waveguide interior. In that case, the dispersion relation $D(\omega,k_x,k_y,k_{11})=0$ is approximately $$\omega^2 - [k_x^2 + k_y^2 + k^2(\omega,k_x,k_y)] \frac{c^2}{n^2} = 0 \quad (6)$$

where n is the effective index of refraction $\epsilon\mu$ of the waveguide. (In practice, the effective index of refraction n can be obtained with periodic structures as well as by the use of materials which have polarizabilities and/or permeabilities.) In that case, also we may write $k_x = K_x$ and $k_y = K_y$ and write $$f_{k_x k_y}(x,y) = \frac{1}{2\pi} (e^{ik_x x + ik_y y}) \quad (7)$$

so that here (on comparing eq. [5] and eq. [1] for $z=0$)

$$B(k_x,k_y) = A_T(k_x,k_y) \quad [8]$$

By inspection, then, it is apparent that $$|B(k_x,k_y)|^2 = |A_T(k_x,k_y)|^2 = |A_T(k_x,k_y)e^{-ik_{11}(k_x,k_y)}|^2 \quad (9)$$

Accordingly, the key to transmitting an image down a multimode waveguide is to transmit the Fourier transform of the image rather than the image itself.

In Fourier optics, the means of forming the spatial Fourier transform of an image is well understood. The basic idea is that the Fourier transform of the field in an aperture $A_B(x,y)$ is given automatically by the radiation field in the distant Fraunhoffer zone of the aperture. To appreciate this, consider the wave equation $$\nabla^2 A + \omega^2 A/c^2 = 0 \quad [10]$$

for a field which has a frequency $\omega$. Then, the following may be written:

$$A(x,y,z) = \int dk_x dk_y dk_z \, A_{Tk_x k_y k_z} e^{i(k_x x + k_y y + k_z z)} \quad (11)$$

with the constraint $$\omega^2 = (k_x^2 + k_y^2 + k_z^2)c^2 \quad [12]$$

Writing $$k_z = \frac{\omega'}{c} \cos\theta, \quad (13a)$$

$$k_y = \frac{\omega'}{c} \sin\theta\sin\phi \quad (13b)$$

$$k_x = \frac{\omega'}{c} \sin\theta\cos\phi, \quad (13c)$$

equation [11] becomes $$A(x,y,z) = \int \frac{\omega'^2 d\omega'}{c^3} \sin\theta d\theta d\phi \delta(\omega' - \omega) A_T(\omega,\theta,\phi) * \quad (14)$$

$$e^{i\frac{\omega'}{c}[\sin\theta\cos\phi x + \sin\theta\sin\phi y + \cos\theta z]}$$

-continued $$= \frac{\omega^2}{c^3} \int \sin\theta d\theta d\phi A_T(\omega,\theta,\phi) e^{i\frac{\omega}{c}[\sin\theta\cos\phi x+\sin\theta\sin\phi y+\cos\theta z]}$$

where $$A_T(\omega,\theta,\phi)=A_{Tk_x k_y k_z} \quad (15)$$

with $k_x, k_y, k_z$ constrained by equation [12].

If the aperture is taken at z=0, then $$A_B(x,y) = \frac{\omega^2}{c^3} \int \sin\theta d\theta d\phi A_T(\omega,\theta,\phi) e^{i\frac{\omega}{c}[\sin\theta\cos\phi x+\sin\theta\sin\phi y]} \quad (16)$$

i.e., $$A_T(\omega,\theta,\phi)=(1/2\pi)\int dxdy A_B(x,y)e^{-i(\omega/c)\sin\theta[\cos\phi x+\sin\phi y]} \quad [17]$$

the Fourier transform of the aperture field.

Next, introducing polar coordinates, $$x=R\sin\Theta\cos\Phi \quad (189)$$

$$y=R\sin\Theta\sin\Phi \quad (186)$$

$$z=R\cos\Theta \quad (186)$$

Then equation [14] becomes on writing $$A(x,y,z)=A(R,\Theta,\Phi), \quad [19]$$

$$A(R,\Theta,\Phi) = \quad (20)$$

$$\frac{\omega^2}{c^3} \int \sin\theta d\theta d\phi A_T(\omega,\theta,\phi) e^{i\frac{\omega}{c}R[\sin\theta\sin\Theta\cos(\Phi-\phi)+\cos\theta\cos\Theta]}$$

Since $\omega R/c \gg 1$ at points which are many wavelengths away from the aperture, equation [20] may be approximated by stationary phase. Accordingly, $$\theta=\Theta+\delta\theta \quad [21a]$$

$$\phi=\Phi+\delta\phi \quad [21b]$$

is expanded so that $$\sin\theta\sin\Theta\cos(\Phi-\phi)+\cos\theta\cos\Theta=1-|\delta\Theta|^2/2-\sin^2\Theta|\delta\phi|^2/2+ \quad [22]$$

In that case, equation [20] can be approximated by $$A(R,\Theta,\Phi) = \quad (23)$$

$$\frac{\omega^2}{c^3} \sin\Theta A_T(\omega,\theta,\Phi) \int e^{i\frac{\omega}{c}R[1-\frac{(\delta\theta)^2}{2}-\sin^2\Theta\frac{(\delta\phi)^2}{2}]} d\delta\theta d\delta\phi$$

$$= \frac{2\omega}{c^2} A_T(\omega,\Theta,\Phi) \frac{e^{i\frac{\omega}{c}R}}{R} I^2$$

where $$I = \int_{-\infty}^{\infty} d\xi\, e^{i\xi^2} = (1+i)\left(\frac{\pi}{c}\right)^{1/2} \quad (24)$$

In other words, the field in the Fraunhoffer zone is given by the Fourier transform of the field in the source aperture, with an additional phase factor related to the distance from the aperture. The latter phase is of no importance in evaluating the intensity $A^*(R,\Theta,\Phi)A(R,\Theta,\Phi)$.

The condition for being in the Fraunhoffer zone is simply the condition for being able to neglect the higher order terms in the expansion in equation [22]. If the transverse dimension of the aperture is denoted by W, then it is straightforward to see that the requirement is $$z \gg \omega W^2/c \quad [25]$$

where z is the distance (perpendicular to the aperture plane) from the aperture.

Figure 3:
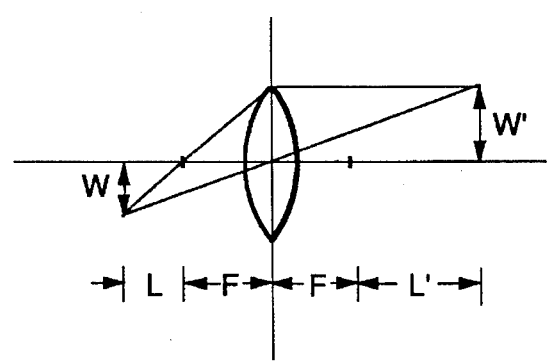
FIG. 3 is a diagram of a simple lens useful in the disclosure of the present teachings.

With the use of a simple lens, it is in fact possible to reach the Fraunhoffer zone much closer to the aperture. Thus, consider the simple lens of FIG. 3. If the focal length of the lens is f, and the distance from the focal points of the object and image are l and l', then $$ll'=f^2 \quad [26]$$

$$W'/W=f/l \quad [27]$$

In that case, $$z=f+l'+f^2/l+f \quad [28]$$

and the Fraunhoffer condition can be written $$z \gg \frac{\omega}{c} W^2 \quad (29)$$

$$l \ll \frac{f^2}{\left(\frac{\omega}{c}\right)W^2 - f}$$

Since the image and object are related by a magnification factor, equation [29] shows that the field just to the right of the lens will be proportional to the Fourier transform of the field of the image close to the left focal point of the lens.

Accordingly, a simple way to implement the invention is as shown in FIG. 1.

Since a typical core size for a multimode fiber is 50–400 microns, it is desirable to include demagnifying optics to present a small image immediately to the left of the left focal point, and magnifying optics to the right of the right lens. The size of the image at the imaging plane 31 and the properties of the optics preceding it can be optimized by assuring that the light incident as the fiber is within the numerical aperture of the fiber.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An optical waveguide image transmission system comprising:

an elongate optical waveguide having an input aperture and an output aperture;

means for injecting a Fourier transform of an image into a portion of said input aperture of said waveguide comprising:

means for collimating optical energy from said image, and a first lens for transforming said collimated optical energy from said image into a Fourier transform, said first lens having a first focal length and being located a distance equal to said first focal length from said input aperture, such that said Fourier transform of said image is presented to said portion of said input aperture and such that said Fourier transform of said image and a mirror image of said Fourier transform of said image appear on said output aperture; and means for transforming said Fourier transforms of said image at said output aperture comprising:

a second lens for transforming said Fourier transform of said image, said second lens having a second focal length and being located from said output aperture a distance equal to said second focal length, a third lens for transforming said mirror image of said Fourier transform of said image, said third lens having a third focal length and being located from said output aperture a distance equal to said third focal length, a grated mirror for passing said transformed image from said second lens to an image plane, and a first mirror for reflecting said transformed mirror image from said third lens to said grated mirror;

wherein said grated mirror passes said reflected image from said first mirror in a right-side-up orientation along with said transformed image from said second lens to said image plane.

2. The invention of claim 1 wherein said optical waveguide has a substantially planar cross section.

3. The invention of claim 2 wherein said optical waveguide is a one-step index optical waveguide.

4. The invention of claim 3 wherein said optical waveguide is implemented in an integrated optics structure.

5. A method of transmitting an image along an optical waveguide comprising the steps of:

injecting a Fourier transform of an image into an optical waveguide, said waveguide having an input aperture and an output aperture, wherein said step of injecting comprises the steps of:

collimating optical energy from said image, and transforming said collimated energy into a Fourier transform of said image through a first lens having a first focal length which is positioned at a distance equal to the first focal length from said input aperture, such that said Fourier transform of said image is injected into a portion of said input aperture and said Fourier transform and a mirror image of said Fourier transform of said image appear at said output aperture;

transforming said Fourier transforms of said image at said output aperture comprising the steps of:

transforming said Fourier transform of said image through a second lens having a second focal length., said second lens being located at a distance equal to the second focal length from said output aperture, passing said transformed image from said second lens through a grated mirror to an image plane, transforming said mirror image of said Fourier transform of said image at said output aperture through a third lens having a third focal length, said third lens being located at a distance equal to the third focal length from said output aperture, and reflecting said transformed mirror image from said third lens with a first mirror to said grated mirror; and passing said reflected image from said first mirror in a right-side-up orientation along with said transformed image from said second lens to said image plane.

* * * * *